United States Patent
Ren et al.

[11] Patent Number: 5,942,554
[45] Date of Patent: *Aug. 24, 1999

[54] METHOD FOR FORMING HIGHLY COLORED POLYMERIC BODIES

[75] Inventors: Yuijin Ren; Wolter Jager, both of Bowling Green; Douglas C. Neckers, Perrysburg, all of Ohio

[73] Assignee: Spectra Group Limited, Inc., Maumee, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/603,642

[22] Filed: Feb. 20, 1996

[51] Int. Cl.⁶ ..................................................... C08F 2/46
[52] U.S. Cl. ........................ 522/25; 522/31; 522/15; 522/16; 522/26
[58] Field of Search ................. 522/25, 31, 15, 522/16, 26

[56] References Cited

U.S. PATENT DOCUMENTS

| | | | |
|---|---|---|---|
| 4,659,649 | 4/1987 | Dickinson et al. | 430/280 |
| 4,788,125 | 11/1988 | Davis et al. | 430/138 |
| 4,859,572 | 8/1989 | Farid et al. | 430/281 |
| 4,876,172 | 10/1989 | Hillenbrand | 430/253 |
| 4,891,301 | 1/1990 | Aldag et al. | 430/281 |
| 4,940,649 | 7/1990 | Aldag et al. | 430/281 |
| 4,962,011 | 10/1990 | Aldag et al. | 430/281 |
| 5,028,792 | 7/1991 | Mullis | 250/474.1 |
| 5,441,850 | 8/1995 | Marshall et al. | 430/336 |
| 5,453,345 | 9/1995 | Grasshoff et al. | 430/270 |
| 5,514,519 | 5/1996 | Neckers | 430/269 |
| 5,545,676 | 8/1996 | Palazzotto et al. | 522/15 |
| 5,578,424 | 11/1996 | Grasshoff et al. | 430/333 |
| 5,582,956 | 12/1996 | Ehret et al. | 430/337 |
| 5,677,107 | 10/1997 | Neckers | 430/269 |

FOREIGN PATENT DOCUMENTS

| | | | |
|---|---|---|---|
| 0139479 | 5/1985 | European Pat. Off. | G03C 1/76 |
| WO 9709168 | 3/1997 | WIPO | B29C 67/00 |

OTHER PUBLICATIONS

Ren et al., "Simultaneous Photoinduced Color Formation and Polymerization: The Formation of Highly Colored Thin Films from Colorless Precursors Due to Formation of Triarylmethane Cations by Acid Generating Decomposition of Iodonium Salts", Macromolecules, May 20, 1996.

Primary Examiner—Nam Nguyen
Assistant Examiner—Steven H. VerSteeg
Attorney, Agent, or Firm—Thompson Hine & Flory LLP

[57] ABSTRACT

A method for the formation of a colored polymeric body which comprises subjecting a curable composition containing a color precursor and an onium salt to heat or actinic radiation to cure the composition, wherein the color precursor is converted to its colored form, and a curable composition capable of forming a colored polymeric body, are disclosed.

33 Claims, 1 Drawing Sheet

METHOD FOR FORMING HIGHLY COLORED POLYMERIC BODIES

BACKGROUND OF THE INVENTION

The present invention relates to the formation of color in a self-coloring curable composition and to a method for forming highly colored polymeric bodies using such compositions.

The conventional method of obtaining strongly colored films by a photopolymerization process is by adding a colored dye to a photocurable or photopolymerizable composition containing one or more monomers and a photoinitiator. As long as the added dye does not absorb in the region at which the photoinitiator absorbs, the rate of polymerization will, in principle, not be affected by its presence. However, it is far more typical for the absorption spectra of the dye and the photoinitiator to seriously overlap and this slows the polymerization rate to an unacceptably low level.

In some cases spectral overlap can be avoided by the proper choice of the photoinitiator. A photoinitiator can be chosen that absorbs at longer wavelengths than the dye or at regions where the dye absorption has a minimum. Unfortunately, photoinitiators that absorb above 600 nm generally are not efficient. This means that, in cases where the added dye or dyes absorb strongly below 600 nm, photopolymerization at high speed is not feasible. A black ink, where carbon black or metal oxides are added as pigment is essentially uncurable.

Accordingly, there is a need for an efficient method for producing highly colored polymeric bodies such as thin polymeric films at high speed.

SUMMARY OF THE INVENTION

The present invention provides a fast and efficient method for the formation of strongly colored, even black, polymer bodies. In accordance with the invention, a curable composition such as a photocurable or thermally curable composition containing a color precursor is subjected to actinic radiation or thermal treatment such that the composition is cured and an acidic species is generated which converts the color precursor into its colored form. Alternatively, the excited color precursor when subjected to actinic radiation or heat converts to its colored form by electron transfer to an acceptor.

It is believed that, upon irradiation of the polymerizable composition of the present invention containing a polymerizable compound, a color precursor and an onium salt, two competing mechanisms occur for color formation and polymerization. One mechanism (Scheme 1) is the excitation of the color precursor, followed by oxidation of the excited color precursor by the onium salt to form a radical cation which abstracts a hydrogen atom from a hydrogen donor and forms a colored species. This mechanism is believed to be the major reaction in the present invention. The mechanism is illustrated below for Crystal Violet Lactone (CVL) and octyloxyphenylphenyl iodonium hexafluoroantimonate (OPPI).

Scheme 1

CVL+hυ yields CVL*

CVL*+OPPI yields CVL+•

CVL+•+RH yields CVLH+ (colored)

The other mechanism is the direct excitation of an onium salt yielding radicals and cations for polymerization and acid for color formation. The photochemical decomposition of OPPI is illustrated in Scheme 2 below. It is believed that thermal decomposition of OPPI yields the same products. The mechanism is basically a combination of two well known processes.

Scheme 2

OPPI+hυ yields H+

H++CVL yields CVLH+ (colored)

Accordingly, it is an object of the invention to provide a method for causing the formation of color in a color precursor by excitation and oxidation of the color precursor (Scheme 1) or by generating an acidic species photochemically or thermochemically from the reaction of an initiator (Scheme 2).

It is another object of the invention to provide a curable composition capable of forming a highly colored polymeric bodies and especially thin films.

As described in the example below, a 50% epoxy and 50% acrylates hybrid resin (HBRD) has been used with added photoinitiators (a radical photoinitiator and a cation photoinitiator). The addition of the photoinitiators does not inhibit color formation and is believed to increase the rate of polymerization.

It is still another object of the invention to provide a method for simultaneously curing and causing the formation of color in a curable composition.

DETAILED DESCRIPTION OF THE INVENTION

Figure 1:
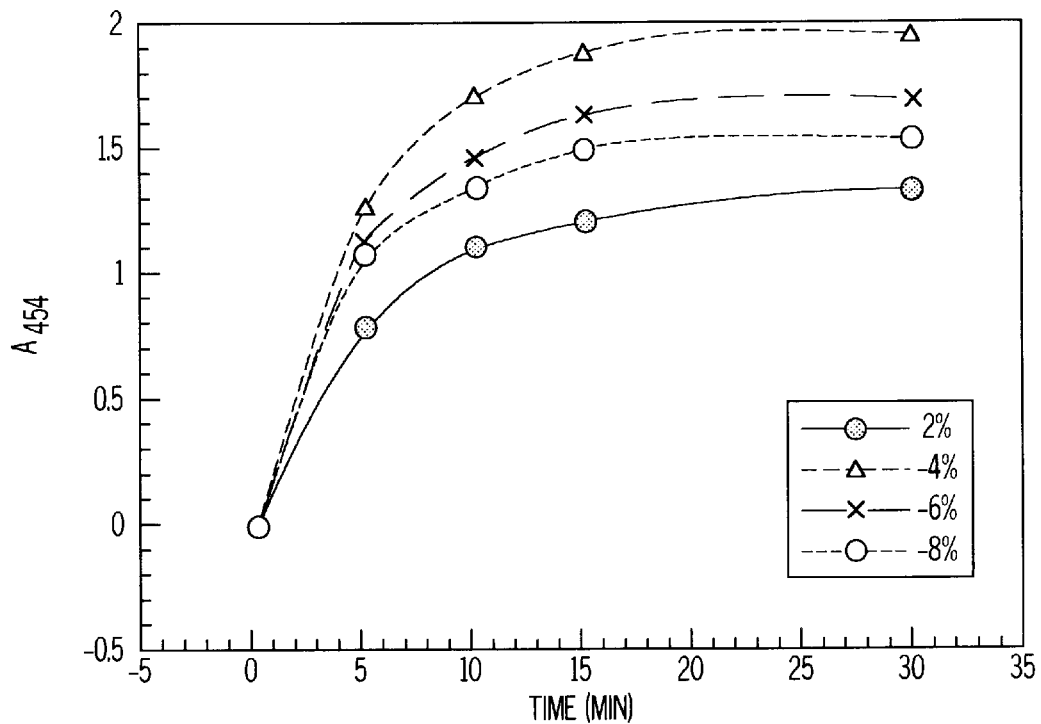
FIG. 1 is a graph illustrating absorption at 454 nm as a function of the irradiation time for 15 $\mu$m HBRD/OPPI/black color precursor films at various color precursor concentrations.

In accordance with the present invention, a method leading to the formation of strongly colored, even black, polymer bodies that can be cured photochemically or thermally is provided. The method is particularly useful for the simultaneous color development and photopolymerization of films using a color precursor such as a lactone and an onium salt such as an iodonium or sulfonium salt.

Onium salts such as iodonium salts are particularly preferred for use in the invention. It is believed that upon photochemical or thermal decomposition, an iodonium salt generates radicals and cations, either or both of which can be used to initiate polymerization, while oxidizing the color precursor or generating an acidic species which converts the color precursor into its colored form. The term "acidic species" is used herein to refer to any Lewis acid which is capable of accepting an electron from the color precursor.

The mechanism by which the onium salt decomposes is still not clear and is influenced by other components in the composition. In the absence of other reactants, apart from the solvent (RH) decomposition of onium salts by direct excitation is believed to occur according to the following Scheme 3:

Scheme 3

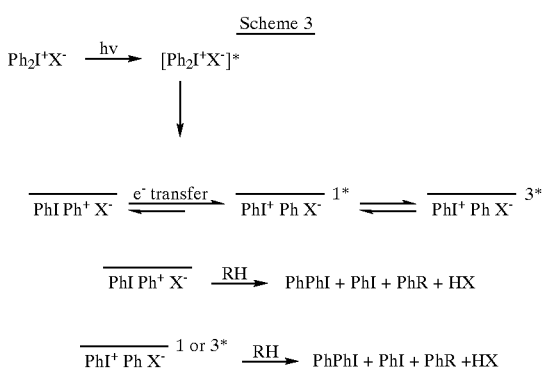

[1* and 3* designate singlet and triplet.]

In this scheme both phenyl cations and phenyl radicals are formed, and these can initiate cationic or free radical polymerization depending on the nature of the monomer. By reacting with the solvent (RH), or other hydrogen donating entity, the typical products formed include a strong acid, e.g., HX where X is a non-nucleophilic anion such as $AsF_6$, $SbF_6$, $PF_6$ or $BF_4$. In the presence of the lactone color precursor, the acid is believed to induce ring cleavage and thus color formation.

Mechanisms for the indirect excitation and activation of iodonium salts have been proposed by Dektar et al., *J. Orq. Chem.* (1990), 55, 39; however, such mechanisms are not applicable since the triplet or singlet energy of the cyclic lactones is too low to excite iodonium salts. A mechanism that is relevant in the present system is the electron transfer from an excited state of the sensitizer to an iodonium ion in its ground state. This mechanism is shown in Scheme 4:

Scheme 4

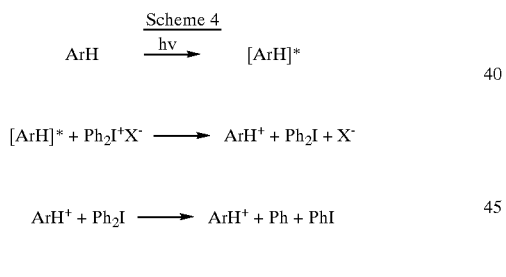

In this mechanism anthracene (ArH) represents the electron donor and the reaction products include phenylanthracenes (ArPh). Phenyl radicals which can induce radical polymerization are also formed in accordance with this mechanism, but no phenyl cations are formed. Once more, an acid (HX) is formed as one of the reaction products.

Acid-induced ring opening of colorless or slightly colored color precursors to form colored species is well known and is an important step in many imaging systems, including carbonless carbon paper, monochrome thermal paper, etc. In carbonless carbon paper, for instance, formation of color is achieved by releasing a solution of the color precursor from microcapsules enabling them to migrate to an acid surface such as a phenolic resin where they develop color. Mechanical fracturing of a physical barrier, e.g., microcapsules, between the color precursor and an acidic phase is the basis of the color formation.

Color precursors found to be useful in carrying the present invention are those which are capable of reacting with acid as is well known in the art, or whose excited states are capable of donating an electron. Preferably, the color precursor is a lactone in which an aromatic ring is fused to the lactone ring, e.g., 6-(dimethylamino)-3,3-bis[4-(dimethylamino)phenyl]-1(3H)-isobenzofuranone (crystal violet lactone (CAS No. 1552-42-7)), 3,3-bis[4-(dimethylamino)phenyl]-1(3H)-isobenzofuranone (malachite green lactone (MGL)), 2'-[bis(phenylmethyl) amino]-6'-diethylaminospirobenzofuran-1(3H),9'-[9H] xanthen]-3-one (green dye precursor (CAS No. 34372-72-0)), 6'-(diethylamino)-3'-methyl-2'-phenylaminospiro [isobenzofuran-1(3H),9'-[9H]xanthen]-3-one (black dye precursor (CAS No. 29512-49-0)), 3-[Bis(4-octylphenyl) amino]-3-[4-dimethylamino)phenyl]-3(3H)-isobenzofuranone (orange dye precursor (CAS No. 67697-75-0)), 3,3-Bis(1-butyl-2-methyl-1H-indol-3-yl)-1(3H)-isobenzofuranone (magenta dye precursor (CAS No. 50292-91-6)), 3,3-bis(1-octyl-2-methyl-1H-indol-3-yl)-1(3H)-isobenzofuranone (red dye precursor (CAS No. 50292-95-0)). Typical lactone color precursors are represented by the formula (I), (II), (III) or (IV):

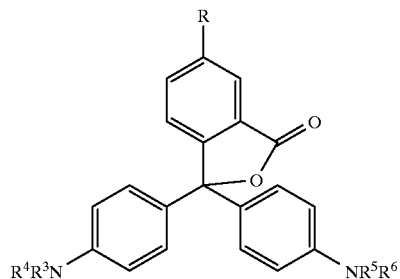

(I)

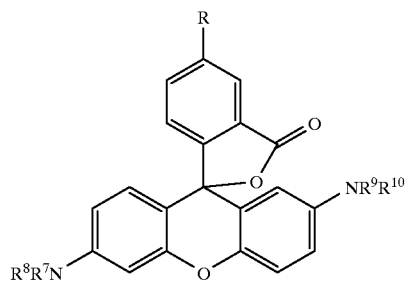

(II)

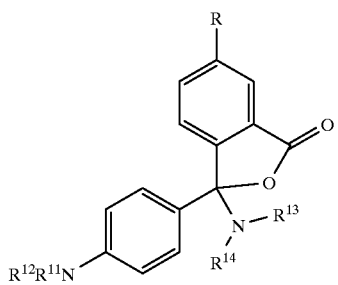

(III)

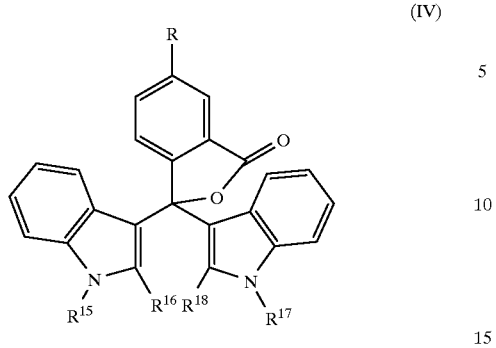

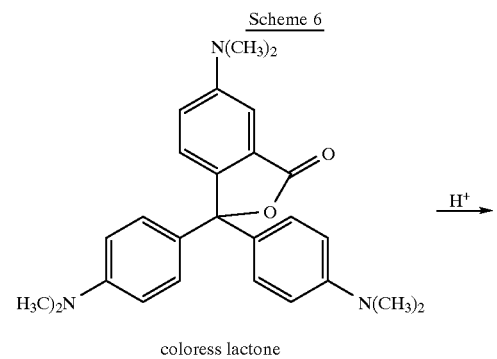

Scheme 6 coloress lactone where R is hydrogen or an amino group having the formula —$NR^1R^2$ wherein $R^1$ and $R^2$ are the same or different and represent hydrogen, aryl, or a $C_1$–$C_8$ alkyl group with the proviso that only one of $R^1$ and $R^2$ may be hydrogen; and $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$, $R^{17}$ and $R^{18}$ are the same or different and represent substituents selected from the group consisting of hydrogen, aryl, and $C_1$ to $C_8$ alkyl group and $R^9$ and $R^{10}$ are a substituent selected from the group consisting of hydrogen, aryl, phenylmethyl, and $C_1$ and $C_8$ alkyl group with the proviso that only one of said substituents attached to each nitrogen atom may be hydrogen.

A typical example of a lactone color precursor is crystal violet lactone (CVL). The acid catalyzed opening of colorless crystal violet lactone to the corresponding highly colored triaryl methane cation is demonstrated in scheme 5:

Scheme 5

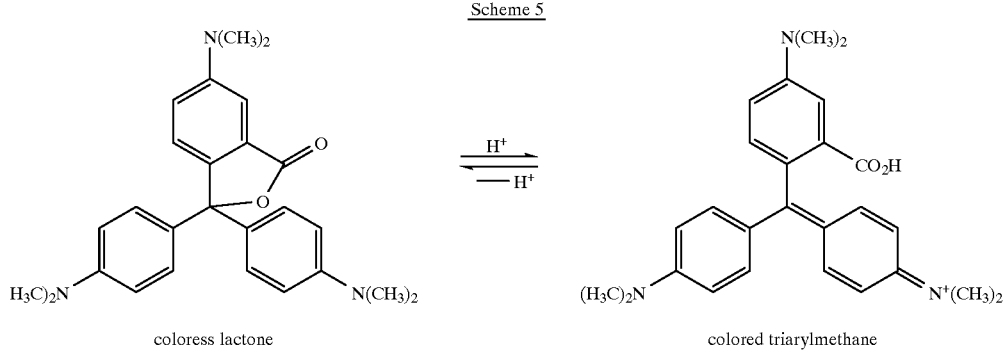

coloress lactone      colored triarylmethane

The mechanism of this ring opening is believed to proceed by protonation of the lactone ring, presumably at the carbonyl oxygen, followed by an opening of the lactone ring. The ring opening is facilitated by electron donation from a dimethylamino group. The mechanism is illustrated in scheme 6 as follows:

-continued

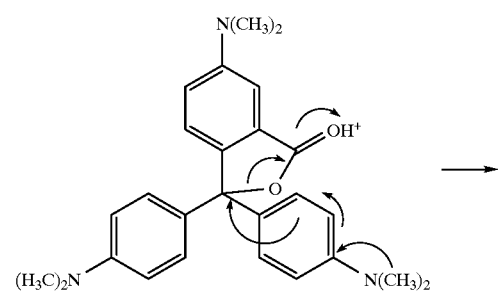

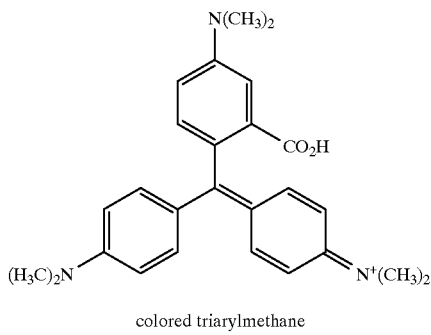

colored triarylmethane

The common element in these compounds is the presence of at least one electron donating moiety such as a nitrogen atom which is in conjugation with the lactone other than through the ring fused to the lactone ring.

When OPPI and a mixture of color precursors are irradiated, either in solution or in monomers, the color formation is believed to take place in a stepwise manner. When crystal violet lactone (CVL) and one of the other color precursors are mixed, the other color precursor fully develops color, while the color formation from crystal violet lactone (CVL) is slow and incomplete. These observations reflect the different chemical nature of the different color precursors and suggests that some chemical tuning of the color precursors needs to be undertaken in order to get a balanced simultaneous color development. The stepwise color formation is presumably a consequence of the fact that the 'acidity' at which the lactone ring is opened is different for the color precursors. For example, by monitoring the color of various color precursors as a function of the fraction of acetic acid in acetonitrile, it was determined that more acetic acid is needed to open the lactone ring in CVL. Therefore, only color precursors for which ring opening take place at the same "acidity" of the medium can be used if simultaneous color formation is desired.

Self-coloring photohardenable compositions in accordance with the present invention in their simplest form include a curable compound, an onium salt and a color precursor. In some cases, the compositions may also include a hydrogen donor, although not essential in the principal embodiments, and for many applications it will also be desirable to include a photoinitiator in the composition.

While OPPI is a preferred onium salt, other iodonium salts and sulfonium salts are also suitable for use in the invention. Decomposition of OPPI can be achieved photochemically or thermally at about 120° C. Examples of onium salts useful in the present invention include iodonium salts and sulfonium salts and, more particularly, diaryliodonium hexaflurophosphates, diaryliodonium arsenates and diaryliodonium antimonates. The counter ion of the onium salts is usually a nonnucleophilic semimetal complex such as $SbF_6^-$, $AsF_6^-$, $PF_6^-$, and $BF_4^-$. A more complete list of iodonium salts appears in published International Application PCT/US/95/05613. Representative examples of iodonium salts include salts having the following structures: $C_nH_{2n+1}C_6H_4I^+(C_6H_5)$, $(C_nH_{2n+1}C_6H_4)_2 I^+$, $(C_nH_{2n+1}OC_6H_4)I^+(C_6H_5)$ and $(C_nH_{2n+1}OC_6H_4)_2I^+$ where n is preferably 1 to 12 and typically 8 to 12 and most preferably, the diaryliodonium salts such as 4,4'-dimethyldiphenyliodonium tetrafluoroborate and (4-octyloxyphenyl) phenyliodonium hexafluoroantimonate (OPPI).

Because decomposition of the onium salt is accompanied by the generation of free radicals and cations, the curable material may be a free radical curable or a cation curable material or a blend of the two. There is a large number of monomers which can be polymerized by cations. These monomers can be classified according to their functionality. They include cyclic ethers, cyclic formals and acetals, vinyl ethers, and epoxy compounds. These monomers can be monofunctional, difunctional and multifunctional. They may also be large molecular weight prepolymers and oligomers. Examples of cationically polymerizable compounds include epoxy compounds, vinyl or allyl monomers, vinyl or allylic prepolymers, vinyl ethers, vinyl ether functional prepolymers, cyclic ethers, cyclic esters, cyclic sulfides, melamineformaldehyde prepolymers, phenol formaldehyde prepolymers, cyclic organosiloxanes, lactams and lactones, cyclic acetals and epoxy functional silicone oligomers.

Epoxy monomers are the most important class of cationic polymerizable substrates. These materials are readily available and the resulting cured polymers possess excellent dimensional and thermal stability as well as superior mechanical strength and chemical resistance. They are widely used in the coating, painting and adhesives industry. Examples of cationically polymerizable epoxy compounds described in the literature include any monomeric, dimeric or oligomeric or polymeric epoxy material containing one or a plurality of epoxy functional groups. Examples of polymerizable epoxy compounds include bisphenol-A-diglycidyl ether, trimethylene oxide, 1,3-dioxolane, 3,4-epoxycyclohexylmethyl-3',4'-epoxycyclohexyl carboxylate, phenyl glycidyl ether, 4-vinylcyclohexene dioxide, limonene dioxide, cycloaliphatic epoxides such as 1,2-cyclohexene oxide, epichlorohydrin, glycidyl acrylate, glycidyl methacrylate, styrene oxide, allyl glycidyl ether, etc. Resins which result from the reaction of bisphenol A (4,4-isopropylidenediphenol) and epichlorohydrin, or from the reaction of low molecular weight phenol-formaldehyde resins (Novolak resins) with epichlorohydrin have been used alone or in combination with an epoxy containing compound. In addition, polymerizable epoxy compounds include polymeric materials containing terminal or pendant epoxy groups. Examples of these compounds are vinyl copolymers containing glycidyl acrylate or methacrylate as one of the comonomers. Other classes of epoxy containing polymers amenable to cure have also been described in the literature and include epoxy-siloxane resins, epoxy-polyurethanes and epoxy-polyesters. Such polymers usually have epoxy functional groups at the ends of their chains. Epoxy-siloxane resins and the method for making them are more particularly shown by E. P. Plueddemann and G. Ganger, J. Am. Chem. Soc. 81 632–5 (1959), and in Crivello et al., Proceeding ACS, PMSE, 60, 217 (1989). As described in the literature, epoxy resins can also be modified in a number of standard ways such as reactions with amines, carboxylic acids, thiols, phenols, alcohols, etc. as shown in U.S. Pat. Nos. 2,935,488; 3,235,620; 3,369,055; 3,379,653; 3,398,211; 3,403,199; 3,563,850; 3,567,797; 3,677,995, etc. Further examples of epoxy resins are shown in the Encyclopedia of Polymer Science and Technology, Vol. 6, 1967, Interscience Publishers, New York, pp. 209–271.

Examples of vinyl or allyl organic monomers which have been used in the literature in the practice of the cationic polymerization include, for example, styrene, vinyl acetamide, methyl styrene, isobutyl vinyl ether, n-octyl vinylether, acrolein, 1,1-diphenylethylene. R-pinene; vinyl arenes such as 4-vinyl biphenyl, 1-vinyl pyrene, 2-vinyl fluorene, acenapthylene, 1 and 2-vinyl napthylene; 9-vinyl carbazole, vinyl pyrrolidone, 3-methyl-1-butene; vinyl cycloaliphatics such as vinylcyclohexane, vinylcyclopropane, 1-phenyvinylcyclopropane; dienes such as isobutylene, isoprene, butadiene, 1,4-pentadiene, 2-chloroethyl vinyl ether, etc. Some of the vinyl organic prepolymers which have been described are, for example, $CH_2=CH-O-(CH_2O)_n-CH=CH_2$, where n is a positive integer having a value up to about 1000 or higher; multi-functional vinylethers, such as 1,2,3-propane trivinyl ether, trimetheylolpropane trivinyl ether, polyethyleneglycol divinylether (PEGDVE), triethyleneglycol divinyl ether (TEGDVE), vinyl ether-polyurethane, vinyl ether-epoxy, vinyl ether-polyester, vinyl ether-polyether and other vinyl ether prepolymers such as 1,4-cyclohexane dimethanol-divinylether, commercially available from GAF and others, and low molecular weight polybutadiene having a viscosity of from 200 to 10,000 centipoises at 25° C., etc.

A further category of cationically polymerizable materials are cyclic ethers which are convertible to thermoplastics. Included by such cyclic ethers are, for example, oxetanes such as 3,3-bis-chloromethyloxetane alkoxyoxetanes as shown by U.S. Pat. No. 3,673,216; oxolanes such as tetrahydrofuran, oxepanes, oxygen containing spiro compounds, trioxane, dioxolane, etc. In addition to cyclic ethers, there are also included cyclic esters such as lactones, for example, propiolactone, cyclic amines, such as 1,3,3-trimethylazetidine and cyclic organosiloxanes, for example. Examples of cyclic organosiloxanes include hexamethyl trisiloxane, octamethyl tetrasiloxane, etc. Cyclic acetals may also be used as the cationic polymerizable material. Examples of epoxy functional silicone oligomers are commercially available from General Electric and are described in ACS PMSE Proceeding 1989, Vol. 60, pp. 217, 222.

Because the photoinitiator generates both free radicals and cations, it is possible to utilize a combination of free radical polymerizable and cationic polymerizable monomers. Examples of free-radical polymerizable monomers include both monomers having one or more ethylenically unsaturated groups, such as vinyl or allyl groups, and polymers having terminal or pendant ethylenic unsaturation. Such compounds are well known in the art and include acrylic and methacrylic esters of polyhydric alcohols such as trimethylolpropane, pentaerythritol and the like, and acrylate or methacrylate terminated epoxy resins, acrylate or methacrylate terminated polyesters, etc. Representative examples include ethylene glycol diacrylate, ethylene glycol dimethacrylate, trimethylolpropane triacrylate (TMPTA), pentaerythritol tetraacrylate, pentaerythritol tetramethacrylate, dipentaerythritol hydroxypentacrylate (DPHPA), hexanediol-1, 6-dimethacrylate, and diethyleneglycol dimethacrylate.

Examples of materials which are both cationically and free radically cured include glycidyl methacrylates, epoxy acrylates, acrylated melamine formaldehyde and epoxidized siloxanes. The simultaneous utilization of a cationically and free radical curable system enables rapid curing to be accomplished and provides a wide latitude in the design of product performance. For example, when a solution of acrylate and epoxy acrylate is used as the dual curable composition, film properties ranging from flexible to rigid can be produced and desired adhesive characteristics can be produced by selection of designed ratios of functional groups. The epoxy functionality provides high temperature resistance, excellent adhesion and reduced oxygen sensitivity whereas the acrylate functionality provides rapid curing speed, excellent weatherability, flexibility and desirable viscosity. Other examples of dual curable systems will be envisioned and appreciated by those skilled in the art. It has been found that a mixture of an acrylate and an epoxy compound is particularly desirable for use herein.

In accordance with one embodiment of the present invention, a photoinitiator is included in the self coloring photohardenable composition. Some typical examples of photoinitiators which are expected to be useful in the present invention are a-alkoxy phenyl ketones, O-acylated-a-oximinoketones, polycyclic quinones, benzophenones and substituted benzophenones, xanthones, thioxanthones, halogenated compounds such as chlorosulfonyl and chloromethyl polynuclear aromatic compounds, chlorosulfonyl and chloromethyl heterocyclic compounds, chlorosulfonyl and chloromethyl benzophenones and fluorenones, haloalkanes, a-halo-aphenylacetophenones, halogenated paraffins (e.g., brominated or chlorinated paraffin) and benzoin alkyl ethers. A wide range of xanthene or fluorone dyes may be used as photoinitiators in accordance with the invention. Some examples include Methylene Blue, rhodamine B, Rose Bengal, 3-hydroxy-2,4,5,7-tetraiodo-6-fluorone,5,7-diiodo-3-butoxy-6-fluorone, erythrosin B, Eosin B, ethyl erythrosin, Acridine Orange, 6'-acetyl-4,5,6,7-tetrachloro-2',4',5',6',7'-tetraiodofluorescein (RBAX), and the fluorones disclosed in U.S. Pat. No. 5,451,343.

For some applications it may be desirable to include a hydrogen donor in the compositions of the invention. Useful hydrogen donors can be selected from among those known in the art and, more particularly, from known hydrogen donating coinitiators. Non-nucleophilic amines such as aromatic amines of low basicity are particularly useful in the invention. The relative efficiency of the hydrogen donor in cationic polymerization not only depends on the efficiency of radical generation, but also on the efficiency of the oxidation of the radicals to cations as well as on the efficiency of the cation to initiate the cationic polymerization. The hydrogen donor must have a low basicity and low nucleophilicity. If the hydrogen donor is too basic, it will deactivate the cationic center responsible for initiation. Only aromatic amines with a hydrogens are capable of initiating ring opening polymerization of cyclohexene oxide. Aliphatic amines, aromatic amines without a hydrogens and non-amine hydrogen donors are incapable of the initiation with cyclohexene oxide. Representative examples of N,N-dialkylanilines useful in the present invention are 4-cyano-N,N-dimethylaniline, 4-acetyl-N,N-dimethylaniline, 4-bromo-N,N-dimethylaniline, 4-methyl-N,N-dimethylaniline, 4-ethoxy-N,N-dimethylaniline, N,N-dimethylthioanicidine, 4-amino-N,N-dimethylaniline, 3-hydroxy-N,N-dimethylaniline, N,N,N'N'-tetramethyl-1,4-dianiline, 4-acetamido-N,N-dimethylaniline, 2,6-diethyl-N,N-dimethylaniline, N,N,2,4,6-pentamethylaniline(PMA) p-t-butyl-N,N-dimethylaniline and N,N-dimethyl-2,6-diisopropyl aniline. Also useful as hydrogen donors are N-phenylglycine and N,N-dimethyltoluidine. However, the invention is not limited to the use of amines or aromatic amines as hydrogen donors. Other compounds present in the composition may be capable of functioning as a hydrogen donor. For example, many monomers are capable of acting as hydrogen donors and compositions containing these compounds may be used effectively with or without amines. A specific example of such monomer are certain cycloaliphatic epoxides.

Solvents may be necessary to dissolve components of the system including the photoinitiator, the color precursor, etc., if they are not sufficiently soluble in the monomer. Some examples of useful solvents are ethyl acetate, etc. Other useful solvents can be identified readily.

The nature of the monomer or polymerizable material, the amount of the color precursor and onium salt in curable self-coloring compositions in accordance with the present invention will vary with the particular use of the compositions, the emission characteristics of the exposure sources, the development procedures, the physical properties desired in the polymerized product and other factors. With this understanding, compositions in accordance with the invention will generally fall within the following compositional ranges in parts by weight (based on 100 parts total).

| | |
|---|---|
| Curable compound | 60 to 99 |
| Color Precursor | 0.1 to 15 |
| Photoinitiator | 0 to 10 |
| Onium Salt | 0.1 to 15 |

Compositions in accordance with the invention more typically are anticipated to have the following formulation:

| | |
|---|---|
| Curable compound | 80 to 95 |
| Color Precursor | 3 to 10 |
| Photoinitiator | 0.5 to 2.0 |
| Onium Salt | 3.0 to 10 |

The compositions of the present invention are useful in the following applications: color lithography, black ink lithography, color printing, in color filters for liquid crystal displays, etc. The photohardenable composition of the invention may also be advantageous for use in the three dimensional modeling process taught in U.S. Pat. No. 4,575,330 to Hull and copending and allowed U.S. application Ser. No. 08/224,503 filed Apr. 7, 1994, the latter being hereby incorporated by reference.

In accordance with the invention, efficient polymerization can be achieved, by irradiating a mixture of OPPI and CVL in acrylates. No photoinitiator is required for this polymerization. During the photopolymerization the development of a blue color, due to the formation of the open triarylmethane cation, is formed. In fact, both the polymerization and the blue coloration can be observed by heating the OPPI/CVL acrylate mixture above 120° C.; the temperature at which OPPI decomposes. Actually, a thermal treatment after a fast photopolymerization can intensify the blue color, see Table 1.

TABLE 1

Absorption at 614 nm for 15 μm CVL/OPPI/HBRD files. [CVL] = 2%, [OPPI] = 4%, HBRD is used with photoinitiators.

| | | $A_{614}$ | | |
|---|---|---|---|---|
| #1 | irr 1 min | plus heat 1 min | plus heat 3 min | plus heat 15 min |
| | 1.3 | 2.4 | 2.7 | 3.1 |
| #2 | irr 1 min | plus irr 1 min | plus irr 3 min | plus irr 15 min |
| | 1.3 | 1.6 | 1.9 | 2.2 |
| #3 | heat 10 min | plus heat 10 min | | |
| | 0.2 | 0.6 | | |

In a preferred embodiment, in order to get stable intensely blue films, the addition of epoxide (at least 10%) is preferred, since the blue color slowly fades in pure acrylates. It has been demonstrated that pure epoxides can be polymerized using crystal violet lactone (CVL) and OPPI, though this process is much slower than the acrylate polymerization. It is anticipated that acrylate epoxide mixtures can be completely polymerized using OPPI and CVL as photoinitiators.

In acetonitrile solution, OPPI decomposition with the formation of blue color is an efficient process when 365 nm light is used. Since OPPI absorbs almost no light at 365 nm, it is suggested that the photopolymerization is initiated mainly by the excitation of CVL as proposed by the mechanism illustrated in Scheme 7:

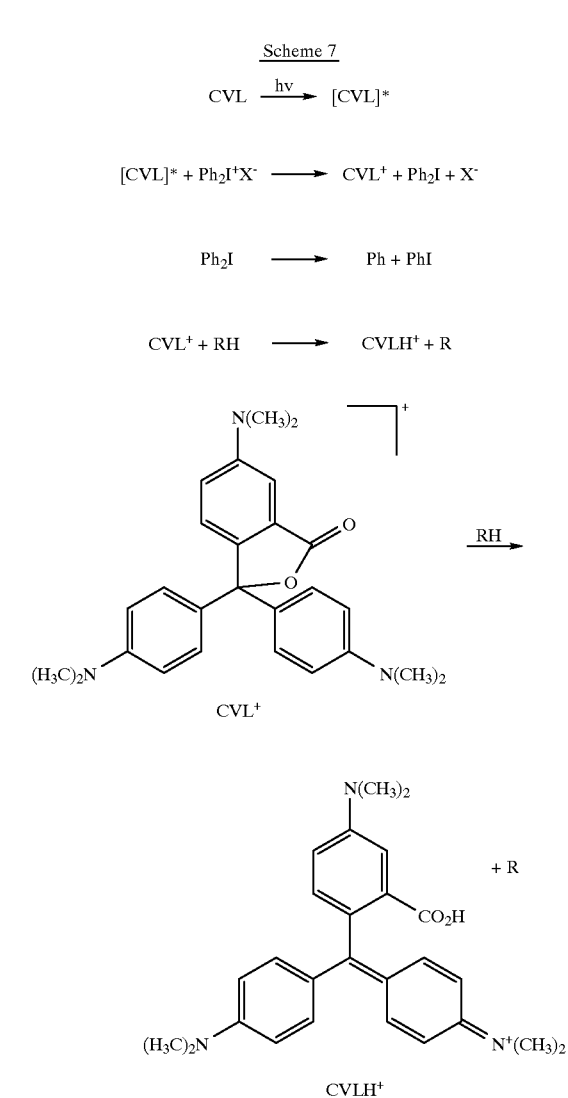

Scheme 7

In Scheme 7 radicals and the colored form derived from CVL are formed and decomposition of OPPI according to this mechanism will result in polymerization and color formation.

Further support for this mechanism comes from the following: Solutions of crystal violet lactone (CVL) and a strong electron acceptor, 1,4-dicyanobenzene in acetonitrile gave blue color when irradiated at 365 nm. Mixtures of CVL and 9-cyanoanthracene or 2,4-diiodo-6-butoxy-3-flurone (DIBF) in acetonitrile gave blue color when excited at 435 nm. These experiments indicate that color formation takes place when CVL is excited in the presence of an electron donor (1,4-dicyanobenzene) and when an electron acceptor (9-cyanoanthracene or 2,4-diiodo-6-butoxy-3-fluorone) is excited in the presence of CVL.

Irradiation of resins consisting of monomers, preferably acrylates or epoxides and most preferably a mixture of acrylates and epoxides, a lactone color precursor and OPPI results in colored films in which the polymerization process and the color formation occur simultaneously.

Although the present invention has no limitations regarding the size or shape of the polymeric body, the optical densities obtained are such that the invention is especially useful for preparing highly colored thin films and particularly for preparing such thin films at high speed. Typically, 15 μm films having optical densities exceeding 4 at the absorption maxima of the developed dye are achieved. In a particular aspect of the invention, intensely black films can be photopolymerized at high speed, an objective that cannot be obtained by dispersing a black pigment in a photocurable ink. In order to form stable intensely black films a combination of 2 or 3 color precursors is generally needed. The optical density of the black film can be increased by adding small quantities of a black pigment such as spinel to the ink, up to an optical density of 2. In this way, the polymerization process can still be carried out at an acceptable rate. The black pigment can act as a stable support that protects the organic dye from excessive light exposure.

The highly colored polymeric films of the present invention are stable to room light and temperature up to about 150° C. At high temperatures above 200° C., the developed dyes appear to undergo some decomposition.

EXAMPLE

Preliminary experiments were performed in either a standard resin (STDR) which contains about 20% polyethylene glycol 400, 40% trimethylolpropane triacrylate (TMPTA), and 40% dipentaerythritol monohydroxy pentacrylate (DPHPA), or in an experimental hybrid resin (HBRD) which contains about 50% epoxy UVR 6105 from Union Carbide (3,4-epoxycyclohexylmethyl 3',4'-epoxycyclohenxane carboxylate) and 30% SR399 pentaacrylate from Sartomer (dipentaerythritol monohydroxy pentaacrylate (DPHPA)) and 20% SR9003 diacrylate from Sartomer (propoxylated neopentyl glycol diacrylate (PNGDA)). The resin HBRD can be used with or without photoinitiators. As photoinitiators, both radical and cationic photoinitiators can be used.

As light source two unfocused 400 W medium pressure Hg arc lamps were used, the sample preparation procedure is as follows: The color precursor was added at the appropriate concentration to the HBRD first, then ethyl acetate was added to dissolve the color precursor (ultrasound). The solvent was evaporated by leaving the bottle open overnight. In the dark room OPPI was added and dissolved in the monomer. A 15 μm teflon spacer was used to control the film thickness. The spacer was placed between two quarz or glass plates, the sample was dropped on the plate, the two plates were clamped together and the entire sample irradiated to form the film. An HP 8452A Diodde Array Spectrophotometer was used for UV-Vis measurements. A 6020 Galaxy Series FT-IR used to measure the double bond conversion in the standard resin.

Figure 2:
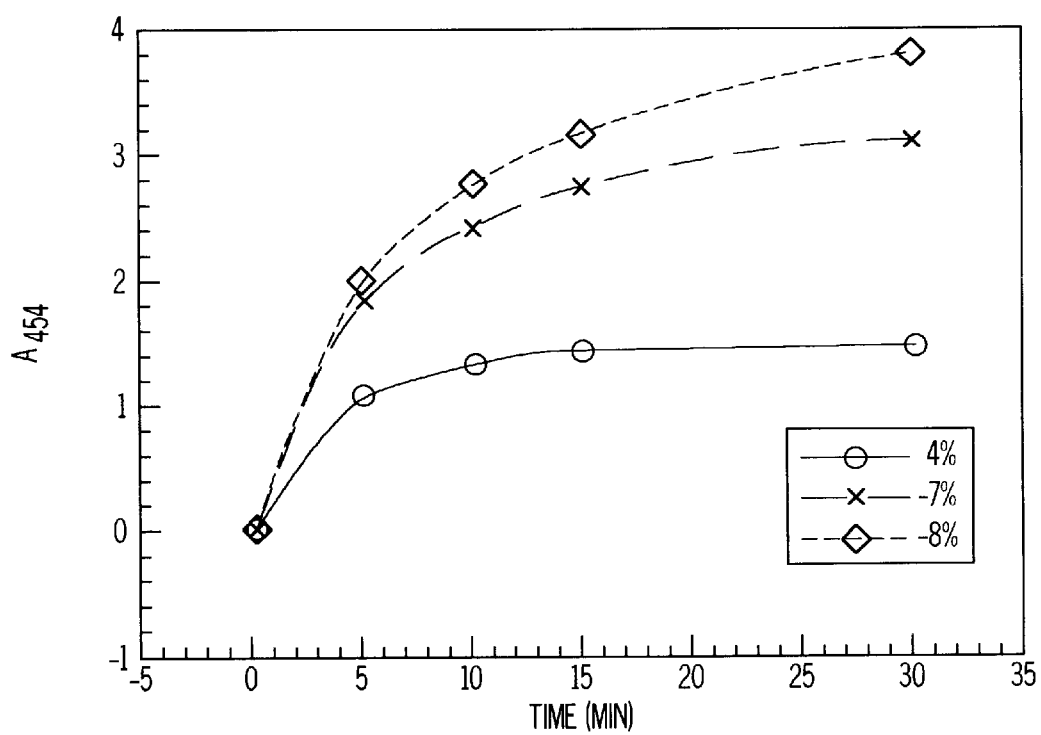
FIG. 2 is a graph illustrating absorption at 454 nm as function of the irradiation time for 15 $\mu$m HBRD/OPPI/black color precursor films at various OPPI concentrations.

Irradiation of resins consisting of HBRD, a color precursor and OPPI results in strongly colored polymeric films in all cases. For example, color development for films containing OPPI and a black color precursor are shown in FIGS. 1 and 2.

For other color precursors, similar results are observed. The highest optical densities obtained for each color precursor are summarized in Table 2.

TABLE 2

Summary of Dyes

| 1 g HBRD, plus | | 5 min | 30 min |
|---|---|---|---|
| 100 mg black, 100 mg OPPI | $A_{450}$ | 2.20 | 3.92 |
| 60 mg red, 60 mg OPPI | $A_{538}$ | 2.64 | 3.29 |
| 80 mg green, 80 mg OPPI | $A_{604}$ | 2.14 | 3.43 |
| 100 mg orange, 80 mg OPPI | $A_{460}$ | 3.28 | 3.60 |
| 40 mg yellow, 40 mg OPPI | $A_{442}$ | 3.26 | 3.22 |
| 40 mg magenta, 40 mg OPPI | $A_{540}$ | 2.24 | 2.81 |
| 40 mg cyan, 40 mg OPPI | $A_{604}$ | 0.70 | 1.45 |
| 60 mg CVL, 45 mg OPPI | $A_{614}$ | 3.82 | 4.00* |

*10 min

The presence of an epoxy in acrylate monomers is useful in intensifying and stabilizing color of crystal violet lactone (CVL) After 600 seconds irradiation, the absorbance at 616 nm in 50% epoxy/50% acrylate is almost twice as intense as in pure acrylate. Furthermore, in pure acrylate resins, the color fades slightly, but the color is stable in the presence of the epoxy resins.

Crystal violet lactone (CVL) serves as a photoinitiator and initiates the radical polymerization of acrylates. To 1 g standard resin (STDR), 90 mg OPPI and 60 mg crystal violet lactone were added and after 10 minutes the double bond conversion is about 40%. No polymerization was observed in a control experiment without OPPI and CVL.

Having described the invention in detail, it will be apparent that modifications and variations are possible without departing from the scope of the invention defined in the appended claims.

What is claimed is:

1. A method for the formation of a colored polymeric body which comprises exposing a curable composition consisting essentially of an admixture of a curable compound, a color precursor and an onium salt to actinic radiation such that the exposed composition is both cured and colored, wherein said color precursor is excited by said radiation converted to its colored form by oxidation of said color precursor by the onium salt.

2. The method of claim 1 wherein said curable composition further contains a hydrogen donor.

3. The method of claim 2 wherein said color precursor is converted to its colored form by means of a radical cation species resulting from the excitation and oxidation of said color precursor, wherein said radical cation species is a radical color precursor cation capable of accepting a hydrogen atom from said hydrogen donor to convert said radical color precursor cation to its colored form.

4. The method of claim 3 wherein the cured polymeric body is further subjected to a thermal treatment at a temperature greater than about 120° C.

5. The method of claim 1 wherein said color precursor is a lactone color precursor represented by the formula (I), (II), (III), or (IV)

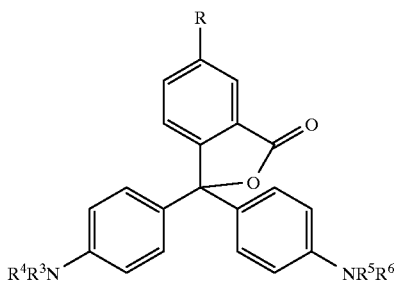

(I)

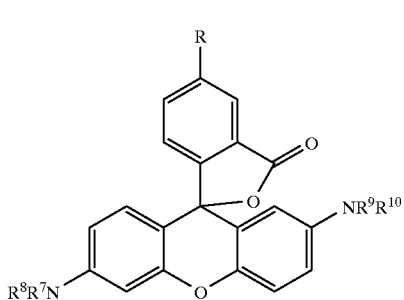

(II)

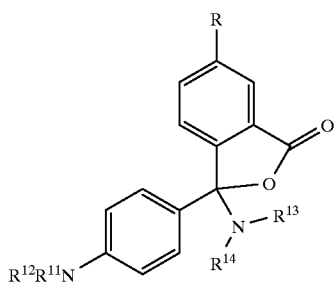

(III)

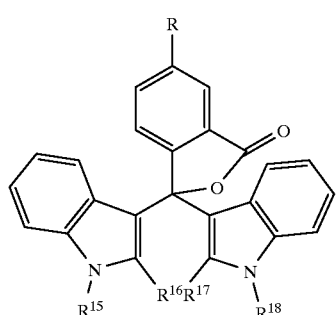

(IV)

where R is hydrogen or an amino group having the formula —NR$^1$R$^2$ wherein R$^1$ and R$^2$ are the same or different and represent hydrogen aryl, or a C$_1$–C$_8$ alkyl group with the proviso that only one of R$^1$ and R$^2$ may be hydrogen; and R$^3$, R$^4$, R$^5$, R$^6$, R$^7$, R$^8$, R$^{11}$, R$^{12}$, R$^{13}$, R$^{14}$, R$^{15}$, R$^{16}$, R$^{17}$ and R$^{18}$ are the same or different and represent substituents selected from the group consisting of hydrogen, aryl, and C$_1$ and C$_8$ alkyl group, and R$^9$ and R$^{10}$ are substituents selected from the group consisting of hydrogen, aryl, phenylmethyl, and C$_1$ and C$_8$ alkyl group with the proviso that only one of said substituents attached to each nitrogen atom may be hydrogen.

6. The method of claim 5 wherein said lactone color precursor is 6-(dimethylamino)-3,3-bis[4-[dimethylamino)phenyl]-1(3H)-isobenzofuranone, 3,3-Bis[4-(dimethylamino)phenyl]-1(3H)-isobenzofuranone, 2'[bis(phenylmethyl)amino]-6'-diethylamino-spiro[isobenzofuran-1(3H),9'-[9H]xanthen]-3-one, 6'-(diethylamino)-3'-methyl 2'-phenylamino-spiro[isobenzofuran-1(3H),9'-[9H]xanthen]-3-one, 3-[bis(4-octylphenyl)amino]-3-[4-dimethylamino)phenyl]-1(3H)-isobenzofuranone, 3,3-bis(1-butyl-2-methyl-1H-indol-3-yl)- 1(3H)-isobenzofuranone, and 3,3-bis(1-octyl-2-methyl-1H-indol-3-yl)-1(3H)-isobenzofuranone.

7. The method of claim 1 wherein said onium salt is an iodonium salt or a sulfonium salt.

8. The method of claim 7 wherein said iodonium salt is (4-octyloxyphenyl) phenyliodonium hexafluoroantimonate.

9. The method of claim 1 wherein said curable composition further contains radical and cationic photoinitiators.

10. The method of claim 1 wherein said curable compound is selected from the group consisting of epoxides, acrylates, methacrylates, vinyl ethers, cyclic formals, cyclic acetals, cyclic ethers, cyclic esters, cyclic sulfides, alkyl monomers, vinyl monomers, vinyl ether functional prepolymers, melamine-formaldehyde prepolymers, phenol-formaldehyde prepolymers, cyclic organosiloxanes, lactams, lactones, epoxy functional silicone oligomers, and mixtures thereof.

11. The method of claim 10 wherein said curable compound is a mixture of an epoxide and one or more acrylates.

12. The method of claim 1 wherein said method is carried out in the presence of a black pigment.

13. The method of claim 12 wherein said black pigment is spinel and said colored polymeric body is a black film.

14. The method of claim 1 wherein color formation and curing occur substantially simultaneously.

15. The method of claim 1 wherein said colored polymeric body is a thin polymeric film.

16. The method of claim 1 wherein exposure of said onium salt to heat or actinic radiation in the presence of said color precursor generates free radicals and cations.

17. The method of claim 1 wherein said composition additionally contains a hydrogen donor and upon exposing said composition, said color precursor is excited and oxidized by said onium salt to form a radical cation of said color precursor and said radical cation abstracts a hydrogen atom from said hydrogen donor to form a colored species.

18. The method of claim 1 wherein the composition additionally contains a photoinitiator.

19. A curable composition capable of forming a colored polymeric body upon being exposed to actinic radiation, said composition consisting essentially of an admixture of a curable compound, a color precursor and an onium salt, wherein said composition is both cured and colored by exposure to actinic radiation, and said composition is formulated such that said color precursor is excited by said radiation and converted to its colored form by oxidation of said color precursor with said onium salt.

20. The composition of claim 19 wherein said color precursor is a lactone color precursor represented by the formula (I), (II), (III) or (IV):

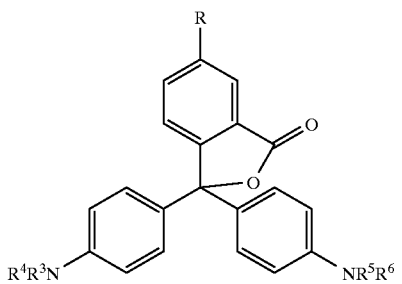

(I)

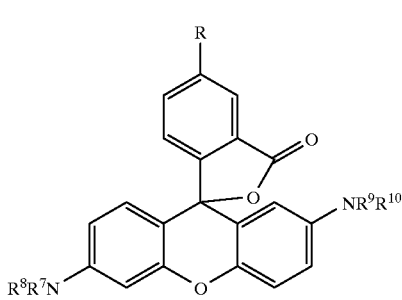

(II)

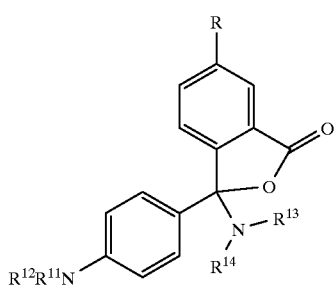

(III)

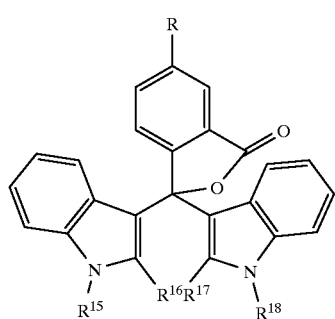

(IV)

where R is hydrogen or an amino group having the formula —NR$^1$R$^2$ wherein R$^1$ and R$^2$ are the same or different and represent hydrogen aryl, or a C$_1$–C$_8$ alkyl group with the proviso that only one of R$^1$ and R$^2$ may be hydrogen; and R$^3$, R$^4$, R$^5$, R$^6$, R$^7$, R$^8$, R$^{11}$, R$^{12}$, R$^{13}$, R$^{14}$, R$^{15}$, R$^{16}$, R$^{17}$ and R$^{18}$ are the same or different and represent substituents selected from the group consisting of hydrogen, aryl, and C$_1$ and C$_8$ alkyl group, and R$^{10}$ is a substituent selected from the group consisting of hydrogen, aryl, phenylmethyl, and C$_1$ to C$_8$ alkyl group with the proviso that only one of said substituents attached to each nitrogen atom may be hydrogen.

21. The composition of claim 20 wherein said lactone color precursor is 6-(dimethylamino)-3,3-bis[4-[dimethylamino)phenyl]-1(3H)-isobenzofuranone, 3,3-Bis [4-(dimethylamino)phenyl]-1(3H)-isobenzofuranone, 2'[bis (phenylmethyl)amino]-6'-diethylamino-spiro [isobenzofuran-1(3H),9'-[9H]xanthen]-3-one, 6'-(diethylamino)-3'-methyl 2'-phenylamino-spiro [isobenzofuran-1(3H),9'-[9H]xanthen]-3-one, 3-[bis(4-octylphenyl)amino]-3-[4-dimethylamino)phenyl]-1(3H)-isobenzofuranone, 3,3-bis(1-butyl-2-methyl-1H-indol-3-yl)-1(3H)-isobenzofuranone, and 3,3-bis(1-octyl-2-methyl-1H-indol-3-yl)-1(3H)-isobenzofuranone.

22. The composition of claim 19 wherein said onium salt is an iodonium salt or a sulfonium salt.

23. The composition of claim 19 wherein said curable compound is selected from the group consisting of epoxides, cyclic formals, cyclic acetals, cyclic ethers, cyclic esters, cyclic sulfides, alkyl monomers, vinyl monomers, vinyl ether functional prepolymers, melamine-formaldehyde prepolymers, phenol-formaldehyde prepolymers, cyclic organosiloxanes, lactams, lactones, epoxy functional silicone oligomers, acrylates, methacrylates, vinyl ethers, and mixture thereof.

24. The composition of claim 23 wherein said curable compound is a mixture of an epoxide and one or more acrylates.

25. The composition of claim 19 further comprising a black pigment.

26. The composition of claim 19 wherein the composition additionally contains a photoinitiator.

27. A curable composition capable of forming a colored polymeric body upon being exposed to heat or actinic radiation, said composition consisting essentially of an admixture of a curable compound, a color precursor, and an onium salt, wherein said composition is formulated such that said composition is both cured and colored by exposure to actinic radiation and said colored precursor is excited by said radiation and converted to its colored form by oxidation of said color precursor with said onium salt, said curable compound, said color precursor, and said onium salt being in direct contact with one another in said composition.

28. A method for forming a cured and colored polymeric body which consists essentially of:

curing and coloring a composition which consists essentially of an admixture of a curable compound, a color precursor, and an onium salt by exposing the composition to heat or actinic radiation wherein said color precursor is excited by said radiation and converted to its colored form by oxidation of said color precursor with said onium salt.

29. The method of claim 28 wherein said onium salt is an iodonium salt or a sulfonium salt.

30. The method of claim 29 wherein said curable compound is selected from the group consisting of epoxides, acrylates, methacrylates, vinyl ethers, styrenes, unsaturated esters, and mixtures thereof.

31. The method of claim 30 wherein said curable compound is a mixture of an epoxide and one or more acrylates.

32. The method of claim 30 wherein said composition additionally contains a colored pigment.

33. A method for forming a cured and colored polymeric body which consists of:

curing and coloring a composition which consists essentially of an admixture a curable compound, a color precursor, and an onium salt by exposing the composition to heat or actinic radiation wherein said color precursor is excited by said radiation and converted to its colored form by oxidation of said color precursor with said onium salt.

* * * * *

UNITED STATES PATENT AND TRADEMARK OFFICE
CERTIFICATE OF CORRECTION

PATENT NO. : 5,942,554
DATED : August 24, 1999
INVENTOR(S) : Ren, et. al.

It is certified that error appears in the above-identified patent and that said Letters Patent is hereby corrected as shown below:

Title page, item
[75] Inventors: "Yuijin Ren" should be --Yijin Ren--.
Col. 5, line 21, delete "$R^9$, $R^{10}$,".
Col. 5, line 26, replace "$C_1$ and $C_8$" with --$C_1$ to $C_8$--.
Col. 15, line 53, replace "$R^{17}$" with --$R^{18}$--.
Col. 15, line 54, replace "$R^{18}$" with --$R^{17}$--.
Col. 15, line 62, replace "$C_1$ and $C_8$" with --$C_1$ to $C_8$--.
Col. 15, line 65, replace "$C_1$ and $C_8$" with --$C_1$ to $C_8$--.
Col. 17, line 54, replace "$R^{17}$" with --$R^{18}$--.
Col. 17, line 55, replace "$R^{18}$" with --$R^{17}$--.
Col. 17, line 62, replace "$C_1$ and $C_8$" with --$C_1$ to $C_8$--.
Col. 17, line 63, after "alkyl group," insert --and $R^9$ and--.

Signed and Sealed this

Twelfth Day of September, 2000

Attest:

Q. TODD DICKINSON

*Attesting Officer*      *Director of Patents and Trademarks*